Feb. 16, 1943.  H. FEDER  2,311,589
METHOD OF MAKING SCORED WALLBOARD
Filed June 26, 1941  3 Sheets-Sheet 1

INVENTOR
Harry Feder
BY Reuben T. Carlson
ATTORNEY

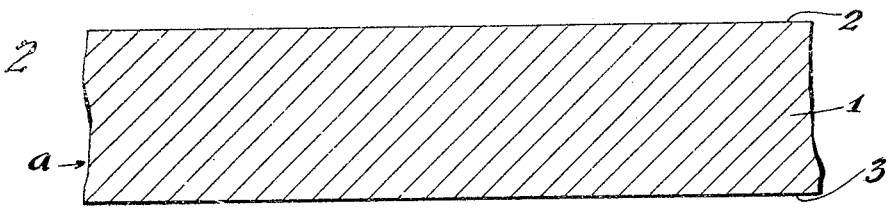
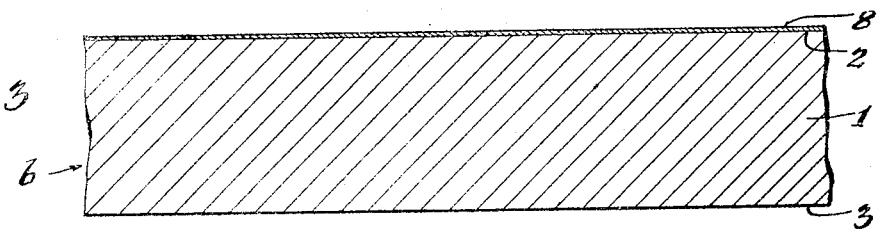
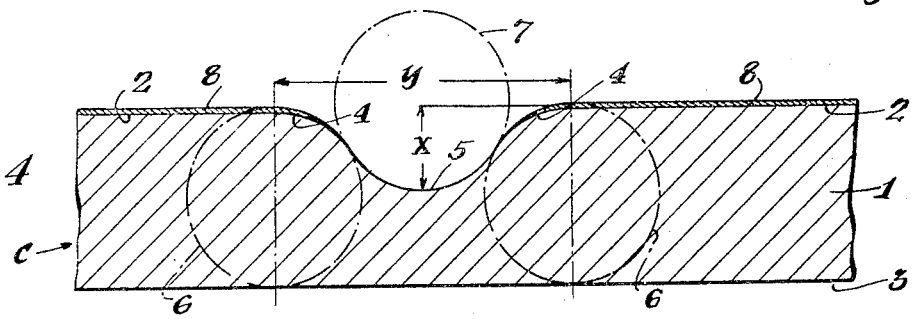
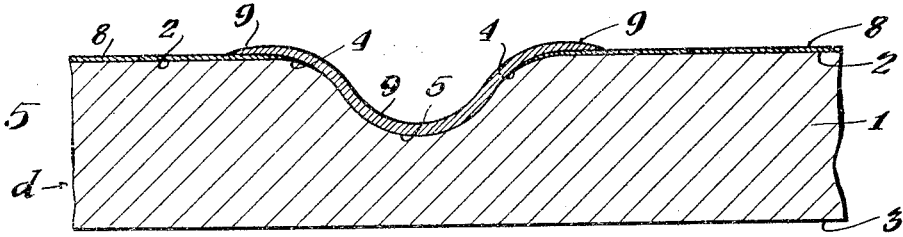
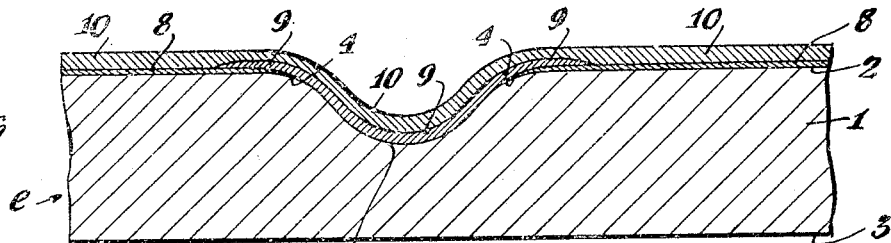
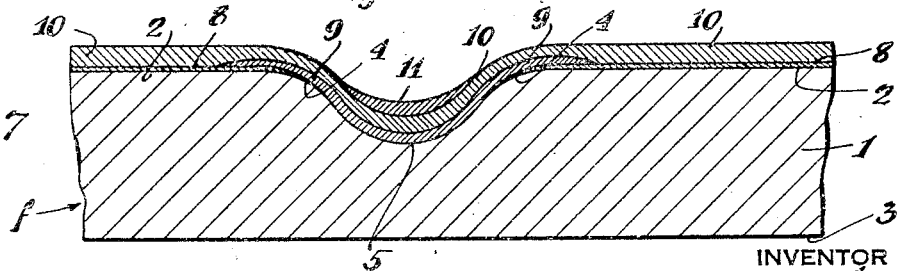

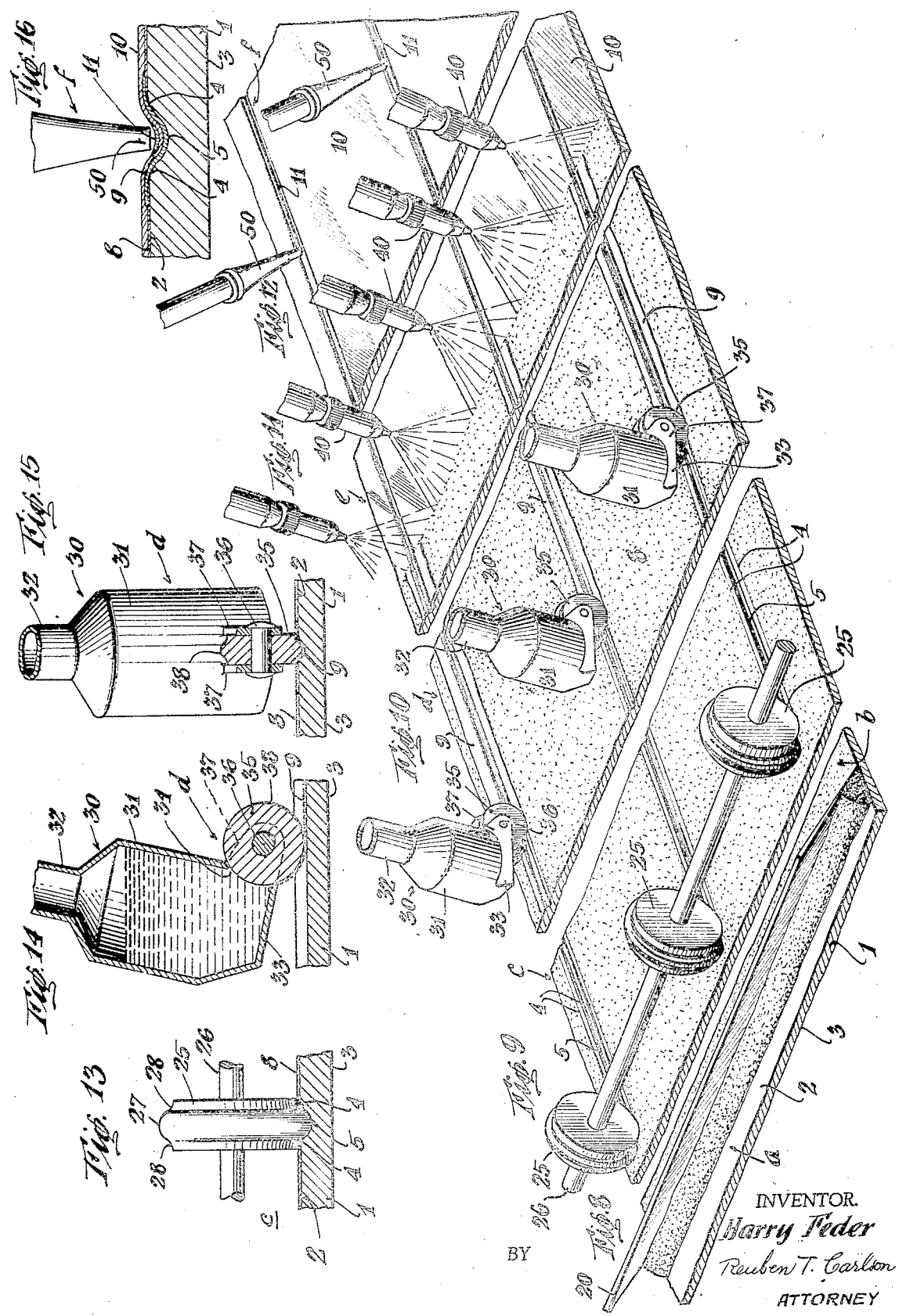

Patented Feb. 16, 1943

2,311,589

UNITED STATES PATENT OFFICE 2,311,589

METHOD OF MAKING SCORED WALLBOARD

Harry Feder, Jackson Heights, N. Y., assignor to Barclay Manufacturing Co. Inc., New York, N. Y., a corporation of New York Application June 26, 1941, Serial No. 399,953

7 Claims. (Cl. 41—17)

This invention relates to method of making scored wallboard, and more particularly to the production of wallboard which is scored or grooved and covered with a coating material to simulate a tiled wall or other surface design.

Scored wallboard has heretofore been made by cutting grooves in fibrous base sheets and coating the surface of the grooved base sheet with a suitable paint, lacquer or enamel material. The enamel coating of such tileboard as heretofore made has had a decided tendency to wear away at the mortar simulating grooves or joints when subjected to normal wear and variations in heat, cold, moisture and dryness normally present in locations where such tileboard is installed. This wearing or scaling of the enamel adjacent the grooves may be attributed to a number or combination of causes. For example, where sharp edges or bends are present in or adjacent the grooves the enamel coating will spread relatively thin thereover, presenting weak points along which the enamel coating wears off. Further, the coating is often less securely bonded within or adjacent the groove areas than along the flat surfaces of the wallboard, so that the enamel coating is weakest and less secure at the very points where the strongest bond is desired.

An object of this invention is to provide an improved method of grooving wallboard whereby the formed grooves present rounded or curved surfaces which join one another and the flat surfaces of the base material in smooth and rounded curves free from any definable bends or edges.

Another object of this invention is to provide an improved method of manufacturing decorated wallboard having grooves defined by curved surfaces to which an enamel coating is firmly cemented and bonderized to present a coating thickness at the grooves which is greater than the enamel coating applied to the flat surfaces of the board.

Another object of this invention is to provide an improved method of manufacturing tileboard presenting smoothly curved grooves simulating mortar joints having multiple enamel coatings covering the trough and shoulder portions of the grooves.

Another object of this invention is to provide a method of manufacturing grooved wallboard which is highly resistant to temperature and moisture changes and conditions and which corrects the wearing and peeling difficulties which occur in tileboard heretofore produced.

A further object of this invention is to provide an improved method of manufacturing tileboard economically and at a high rate of production with a minimum of hand operation.

Other objects and advantages of this invention will become apparent as the disclosure proceeds.

The invention also consists in certain new and original assembly operations hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which Fig. 1 is a plan view of a section of the wallboard showing portions thereof as they appear at various stages of manufacture from the wallboard base to the finished product;

Fig. 2 is an enlarged fragmentary cross-sectional view through the baseboard material prior to treatment thereof, this section being taken along line 2—2 of Fig. 1;

Fig. 3 is an enlarged fragmentary cross-sectional view through the baseboard material after the primer coat has been applied thereto and as it appears when viewed along line 3—3 of Fig. 1;

Fig. 4 is an enlarged fragmentary cross-sectional view through the wallboard, showing the cross-sectional shape of the grooves which are cut into the base material, this view being taken along line 4—4 of Fig. 1;

Fig. 5 is an enlarged cross-sectional view through the wallboard after the bonderizing material has been applied to the bottom of the groove and adjacent shoulder portions thereof, this view being taken along line 5—5 of Fig. 1;

Fig. 6 is an enlarged fragmentary cross-sectional view through the wallboard as viewed along line 6—6 of Fig. 1, this view showing the finishing layer of the selected paint, lacquer or enamel applied thereto;

Fig. 7 is an enlarged fragmentary cross-sectional view of the finished wallboard as it appears when viewed along the line 7—7 of Fig. 1, showing the striping applied to the bottom area of the groove;

Fig. 8 is a fragmentary perspective view illustrating the manner in which the primer coat is preferably applied to the base material;

Fig. 9 is a fragmentary perspective view illustrating the grooving operation in which grooving wheels are employed to form the grooves in the baseboard;

Fig. 10 is a fragmentary perspective view illustrating the manner in which the bonderizing coat may be applied to the grooves and adjacent shoulder portions of the baseboard;

Fig. 11 is a fragmentary perspective view showing the manner in which the finishing enamel coat may be applied to the wallboard;

Fig. 12 is a fragmentary perspective view illustrating the manner in which the striping may be applied to the bottom surfaces of the grooves;

Fig. 13 is an edge view of a grooving wheel which may be employed in forming the grooves in the baseboard, this view illustrating more particularly the peripheral contour thereof;

Fig. 14 is a cross-sectional view of the tool which may be employed to apply the bonderizing coating to the bottom of the groove and adjacent shoulder portions thereof;

Fig. 15 is a front elevational view of the bonderizing tool, in which the applicator wheel is shown in cross-section to illustrate the contour of its peripheral applying surface; and Fig. 16 is a fragmentary view of the lower end of the striping tool which may be used to apply the striping to the bottom area of the groove.

Similar reference characters refer to similar parts throughout the several views of the drawings and the specification.

Figure 1:
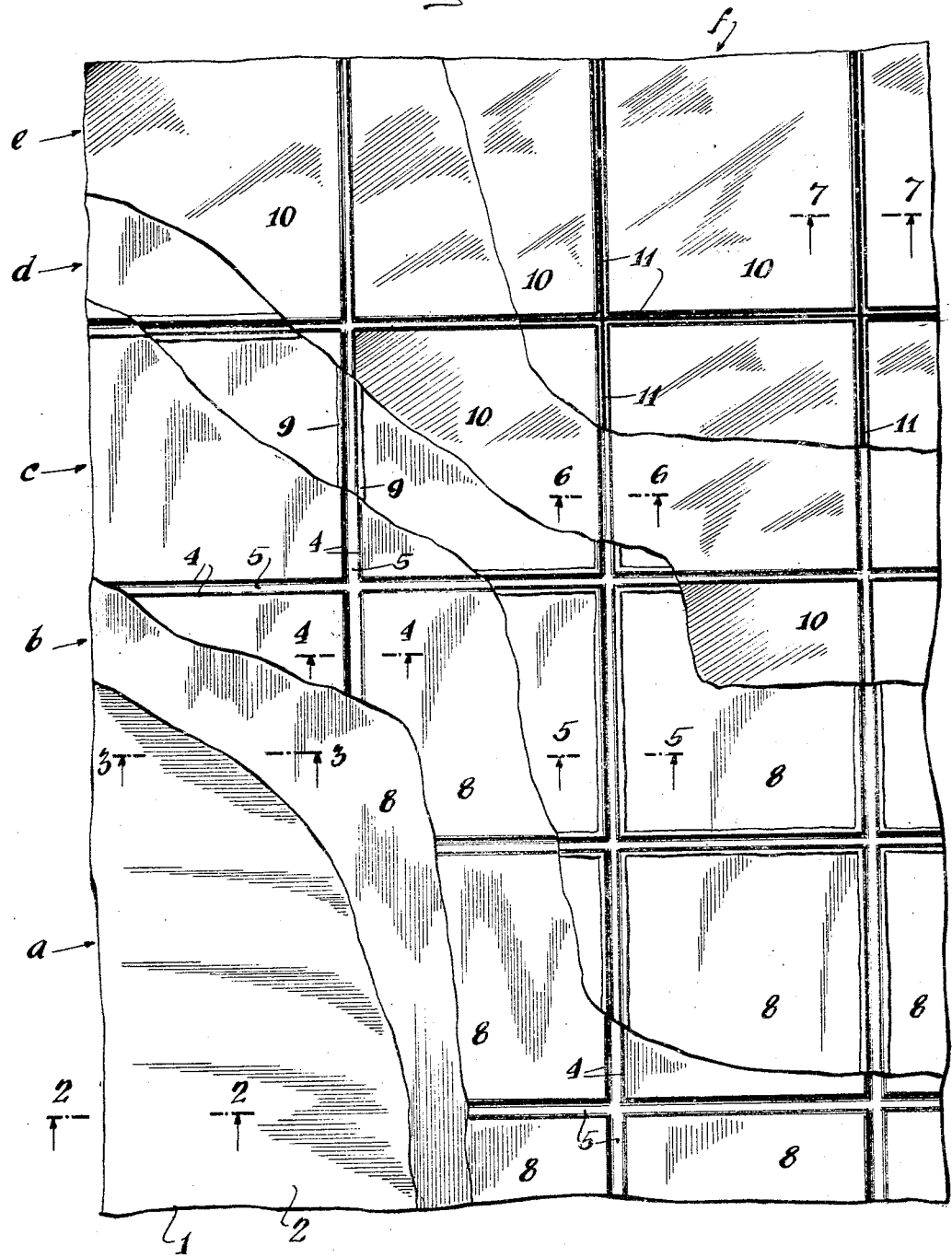

In the manufacture of tileboard, a base sheet is selected which has substantial strength and which presents a face surface which is substantially smooth, level and free from warps, waves, or other surface irregularities. While there are numerous fiberboard and sheet products available which can be used for this purpose, the material commonly used is a board made from pressed fiberboard which is hard, dense and grainless, having a high finish on the surfacing side thereof. This base material commonly used is approximately only one-eighth of an inch thick, which thickness is amply sufficient for the manufacture of tileboard, although base material of greater thickness may be employed. As shown in the drawings, this base sheet 1 is so made as to present a top surface 2 which has a high finish and is substantially smooth and level and substantially free from surface waves, undulations or irregularities. The finishing paints, lacquers or enamels, as will hereinafter be more fully described, are applied to the finished surface 2 of the base sheet. The opposite surface 3 of the base sheet, which is to be positioned adjacent the wall to which the board is applied, may present a surface roughness so that adhesives or like materials applied thereto will firmly bond and secure the tileboard to the wall to which it is to be applied.

A primer coat 8 is first applied to the finished surface 2 of the baseboard illustrated in Figs. 1 and 3, as step b. This primer coat may comprise a urea or phenolic resin mixed with a suitable pigment, a volatile solvent and resin oil. The pigments used in the primer coat preferably have a color which corresponds to the color of the finish coat later applied and the primer coat is so constituted as to be quick drying and may contain appropriate drier material. It is important that the primer coat be so compounded and applied that it will become tenaciously bonded to the surface 2 of the base material. While the primer coat can be sprayed onto the surface 2 of the base sheet, I have found that a more effective and tenacious bond between the primer coat and the base sheet is obtained when the primer coat is applied by means of a doctor blade, as diagrammatically illustrated in Fig. 8. The doctor blade 20, as shown in Fig. 8, spreads the primer coat over and presses the primer coat into the surface 2 of the base material as the base material is advanced under the spreading edge of the doctor blade by means of a suitable conveyor. When the doctor blade method is employed, the primer coat is driven into the surface layer of the board and fills surface depressions. The primer coat is thereby spread into a thin film, which film does not necessarily increase the board thickness. The primer coat may be hardened by air drying or baking.

In the next operation, designated c, the base sheet is grooved, which operation is performed after the primer coat 8 has dried. The forming of this groove, as illustrated more particularly in Fig. 4, is an important feature of this invention. The shoulder portions 4 of each groove are each defined by a true arc of an imaginary circle indicated at 6 in Fig. 4, whose diameters closely approximate the thickness of the base sheet 1. The upper ends of these circular arcs are tangent to the adjacent flat primer filled surfaces 2 of the base sheet so that the arcuate shoulder surfaces 4 merge into the primer filled surfaces 2 in an unbroken line. The centers of the imaginary circles 6 are spaced apart a distance indicated as $y$ which is approximately one and one-half to two times the thickness of the base sheet 1. Assuming that the base sheet 1 is approximately one-eighth of an inch thick, the distance $y$ between the center of the imaginary circles 6 would measure from three-sixteenths to one-fourth of an inch, or approximately $\frac{7}{32}$ of an inch.

The trough portion 5 of the groove is defined by a true arc of an imaginary circle 7 whose diameter is approximately that of the imaginary circles 6 and whose periphery is tangent to the circles 6. The center of the imaginary circle 7 is preferably positioned on a level with or slightly above the surface 2 of the base sheet, so that the maximum depth of the arcuate trough portion 5, as indicated by $x$, will be not greater than and preferably slightly less than the radius of the imaginary circle 7. Assuming that the base sheet 1 is approximately one-eighth of an inch in thickness, the depth $x$ of the groove will be not greater than $\frac{1}{16}$ of an inch and not less than $\frac{3}{64}$ of an inch, or approximately $\frac{7}{128}$ of an inch. It will be noted that the groove as thus formed is composed of three circular arcs of approximately the same radius, which merge into each other in true tangency. The grooves thus formed will closely simulate in appearance the mortar joints of a ceramic tile wall when perfectly laid. Due to the accurate tangency of the circular arcs with one another and with the surface 2 of the base sheet 1, no edges are presented which would cause the finishing enamel applied thereto to break or deteriorate in use.

This grooving operation is performed by a series of properly spaced cutting or grinding wheels 25, which may be fixed to a suitable power driven shaft 26 and when rotated at high speed operate to cut the grooves in the base sheet as the base sheet is advanced thereunder upon a suitable conveyor. Each cutting wheel may be made of a suitable cutting material, such as metal or carborundum, and has a peripheral cutting surface shaped to form the groove illustrated in Fig. 4. Thus the cutting wheel has a rounded cutting section 27 which conforms to the arcuate contour 5 of the groove as formed, and side cutting sections arcuately contoured as at 28 to shape the shoulder portions 4 of the groove. The base sheet can be run under the rotating cutting wheels 25 in one direction only or in two or more directions, so as to give the board the desired grooved pattern. It will be appreciated that the cutting wheels 25 will remove the primer film 8 from the board over the rounded arcuate portions 4 and 5, and the surfaces of the arcuate portions 4 and 5 will present the surface fibers of the base sheet exposed.

The surfaces of the grooves are then coated with a bonderizing material 9 at step d, as indicated in Figs. 5 and 10. This bonderizing material is applied in a manner to fully coat the arcuate surfaces 4 and 5 of the groove and overlap the adjacent edges of the primer coat 8. The bonderizing agent may be formed of substantially the same composition as the finishing or enamel coat 10, and preferably contains the same colored pigments. The bonderizing coat 9 is substantially thicker than the primer coat 8 and will tenaciously adhere to the ground arcuate surfaces 4 and 5 of the groove and to the edges of the primer coat 8.

The bonderizing coat 9 may be applied by an air pressure striping gun, fountain pen brush or striping wheel. The wheel type striping tool 30 illustrated in Figs. 10, 14 and 15 is found to be especially efficient for this purpose. This striping tool 30 comprises a barrel 31 to which the bonderizer material is supplied by a suitable feed tube 32 connected thereto. The barrel 31 may be provided with a hopper portion 33 which leads to an opening 34 in the front wall thereof. An applicator wheel 35 is journaled on an axle 36 fixed to a pair of bracket arms 37 extending forwardly from the hopper portion 33. The applicator wheel 35 has the periphery 38 thereof contoured to generally conform to the shape of the groove in the base sheet and has a width sufficient to extend over the edge portions of the primer coat 8 adjacent the shoulder portions 4 of the groove. The applicator wheel 35 is so positioned that a portion of its periphery substantially closes the opening 34 in the hopper portion 33 so that the bonderizing material will not escape from the opening 34 except as it is carried from the hopper portion on the periphery of the wheel 35 during rotation thereof. A plurality of these applicator tools 30 are arranged in proper spaced relation so as to apply the bonderizing material to the grooves formed in the base sheet and each tool is preferably so arranged that the barrel 31 thereof is inclined so as to effect the proper flow of the bonderizing material to the periphery of the applicator wheel 35. The applicator devices 30 may be arranged in stationary position and the base sheet advanced under the respective applicator wheels thereof by means of a suitable conveyor.

After the bonderizing coating 9 has been applied to all of the grooves in the base sheet, the bonderizing coating is permitted to dry or harden either in the open air or in a drying oven. The drying time may be substantially reduced if the drying oven is used, which may have a temperature of approximately 250° F. When dried and hardened, the bonderizing coat 9 will tenaciously adhere to the surface of the grooves and will not chip or crack since all the edges of the groove are smooth and rounded. The applied bonderizing coat is considerably thicker than the primer coat 8.

In the next step, designated e, the finishing layer 10 is applied smoothly and evenly to the entire surface of the board. The enamel layer may comprise one or more coat applications. The finishing coat may be applied by spraying the same onto the surface of the board by a pressure spray machine having one or more spray nozzles 40, as illustrated in Fig. 11. If desired, a plurality of spray nozzles 40 may be employed, arranged in normally stationary spaced relationship in a manner so that the enamel layer is evenly applied to the surface of the board as the board is advanced under the spray nozzles while supported on a suitable conveyor. While the finishing coat 10 may comprise materials such as lacquers and paints which give a hard wear resistant surface finish, resin enamels are particularly suitable. The enamel coat 10 may be compounded from a base of urea or phenolic resin containing the desired coloring pigment and a vehicle comprising volatile solvents and resin oil. Enameling material which has been found to be highly satisfactory for this purpose comprises a mixture of urea formaldehyde of the maleic and hydrid types combined with glycerophthalate and coloring pigment. The bonderizing coat 9, as heretofore explained, may be formed of the same material and should contain the same coloring pigments as the enamel coat 10. After the enamel coat 10 has been uniformly applied in the manner above described, the coated base sheet is preferably placed in a drying oven having a temperature of approximately 250° F. where the coating is hardened by baking. The temperature of the oven, as well as the time required to harden the enamel coating, may of course vary with the coating material employed, but where the enamel coating is formed from material generally as above described, the enamel coat 10 will be hardened in approximately two hours.

When the enamel layer has been satisfactorily hardened, the base sheet is removed from the oven and the grooves striped as indicated at step f. The stripe 11 is applied to the enamel coating 10 which lies in the trough portion of the groove. This stripping material may possess the same composition as the enamel coating 10, except that a coloring pigment of contrasting color is generally contained in the striping material, so that the bottoms of the grooves will reveal the desired line contrast. The striping coat 11 may be applied by a fountain pen striping tool tip 50 of the desired contour to lay a stripe of the striping material of the desired width at the bottom of each groove, as illustrated in Figs. 12 and 16. Such fountain pen striping tools are well known and need not be further described. The tips 50 of the striping tool may be arranged in relatively stationary inclined position, as shown in Fig. 12, and the base sheet advanced thereunder on a suitable conveyor so that the stripe coating 11 becomes properly deposited in each groove. After the stripe coating 11 has been suitably hardened, the enameled surface of the base sheet may be rubbed down and waxed so as to give the surface a smooth finish and a high polish.

The tileboard as thus formed presents several autogenously bonded coatings of hard wear resisting enamel within the trough portion and around the shoulder portions of each groove, as more particularly illustrated in Fig. 7. The initial bonderizer coat 9 covers not only the trough portion 5 and the shoulders 4 of each groove but overlaps and is bonded to the edges of the primer coat 8. The bonderizer coat 9 has an extremely tenacious bond with the bottom of the groove due to the roughness of the surfaces of the groove caused by the tearing effect of the cutting wheels or discs. Since the enamel coating 10 is composed of substantially the same material as the bonderizing coat 9, it merges and integrally unites therewith. The exterior surface of the covering enamel coat 10 is, however, smooth over all areas thereof, including those areas of the enamel layer 10 which extend into the grooves. Thus a highly attractive and finished groove surface is attained. The enamel surfaces within and over the shoulders of the grooves are doubly reinforced, producing a groove joint which will actually outlast and outwear the enamel coating covering the flat surfaces of the board.

It will be further noted that since the grooves are shaped by a series of joined circular arcs which are tangential to one another and to the flat primer coated surfaces of the board, the bonderizing layer 9 and the finishing or enamel layer 10 may be applied in uniform thickness throughout the trough portion and shoulder portions of the groove and that no sharp bends or edges are present about which the enamel might wear away. The grooves as thus formed also present highly polished, finished surfaces which truly simulate in appearance and form the mortar joints of skillfully laid ceramic tile. A highly attractive wall tile is thus produced which will outwear and outlast tileboard heretofore produced.

By following the various steps of manufacture as heretofore outlined, this improved tileboard can be economically produced and manufactured in substantially continuous production line operation as the base sheets travel along on a continuous conveyor. The primer coat 8 is spread onto the finished surface 2 of the base sheet 1 by the sharp edge of the stationary doctor blade 20 as the base sheet moves along the conveyor. The primer coat may be hardened by air drying or baking. The base sheet is then advanced under the cutting wheels or discs 25 to be grooved. If the board is to receive two sets of grooves, an additional set of grooving wheels or discs 25 is provided, properly arranged with respect to the traveling sheet to apply the grooves in the desired portion thereto as the board continues its directed travel. The bonderizing coat 9 may be applied by a plurality of striping devices which may comprise striping wheels as shown in Figs. 10, 14 and 15, fountain pen stripers, or spray nozzle stripers. The striping operation can be performed as the base sheet continues its forward travel. The drying or curing of the bonderizing coat 9 can be expedited by running the sheets through a suitable drying oven, following which the finishing or enamel coating 10 is applied by spray nozzles 50, which can also be performed as the base sheet continues its travel. The enamel coating 10 on the base sheet is then dried or cured in a baking even of suitable construction, and the striping coat 11 then applied by the striping points 50. If desired, the finished board may be rubbed down and polished with wax to give it a shiny and brilliant appearance. It will thus be appreciated that my improved tileboard is well adapted for high speed production operations with a minimum of hand labor.

It will be appreciated that while the thickness of the primer coat 8, bonderizing coat 9, finishing enamel coat 10, and the striping coat 11 are shown in Figs. 4 to 7 of the drawings substantially thicker in comparison to the thickness of the base sheet 1 than would normally be the case in actual practice, these coatings have thus been magnified for the purpose of illustration only. In actual practice the thickness of each coat is, of course, determined by the character of the coating material employed. While the trough portion 5 of each groove should be defined by a substantially true arc of a circle which merges into the shoulder portions 4, each of which is defined by a substantially true arc of a circle whose ends merge into the primer filled surface 2 of the base sheet, it will be appreciated that in actual practice the depth and the width of the finished grooves may vary as the thickness and character of the base material and the desired design may require.

While certain novel features of the invention have been disclosed herein, and are pointed out in the annexed claims, it will be understood that various omissions, substitutions and changes may be made by those skilled in the art without departing from the spirit of the invention.

What is claimed is:

1. The method of manufacturing decorated wallboard which includes, spreading a primer coat onto the finished surface of a fibrous base sheet by means of a doctor blade, and thereafter cutting spaced grooves through the primer coat and into the base sheet so that each groove is defined by a curved trough surface whose ends join and are tangent to curved shoulder surfaces whose extreme ends merge into and are tangent to the adjacent primer filled flat surfaces of the wallboard.

2. The method of manufacturing decorated wallboard which includes, spreading a primer coat onto the finished surface of the fibrous base sheet, cutting spaced grooves through the primer coat and into the base sheet so that each groove is defined by a curved trough surface whose ends merge into and are tangent to curved shoulder surfaces whose extreme ends merge into and are tangent to the adjacent flat primer filled surfaces of the base sheet, and then applying a bonderizing material to the trough surface and shoulder surfaces of each groove.

3. The method of manufacturing decorated wallboard which includes, spreading a primer coat onto the finished surface of the fibrous base sheet, cutting grooves through the primer coat and into the base sheet so that each groove is defined by three joined circular arcs tangent to one another and to the flat primer filled surfaces of the base sheet, applying a bonderizing coating to the trough portion and the shoulder portions of each groove and in overlapped relation to the adjacent edges of the primer coating, and applying a finishing enamel layer over said bonderizing coating and said primer coating.

4. The method of manufacturing decorated wallboard which includes, spreading a primer coat onto the finished surface of a fibrous base sheet by means of a doctor blade, cutting grooves through said primer coat and into said base sheet, applying a bonderizing material to the grooves and adjacent shoulder portions thereof, applying a series of finishing coats to the primer coat and bonderizing coat, and striping said grooves.

5. The method of manufacturing tileboard which includes, spreading a primer coat onto the finished surface of a fibrous base sheet, cutting grooves through said primer coat and into said base sheet, applying a bonderizing coating material to the grooves and adjacent shoulder portions thereof, hardening said bonderizing material, applying a series of finishing coats to the primer coating and bonderizing coating, hardening said finishing coating, and striping said grooves.

6. The method of manufacturing decorated wallboard which includes, spreading a primer coat onto the finished surface of a fibrous base sheet by means of a doctor blade, cutting grooves through said primer coat and into said base sheet, coating the trough and the shoulder portions of said grooves and the adjacent edges of said primer coat with a finishing coating containing a coloring pigment, applying a series of finishing coats containing coloring pigment similar to that contained in the first-named finishing coating smoothly and uniformly over said primer coat and said first-named finishing coating, and hardening said last-applied finishing coats.

7. The method of manufacturing decorated wallboard which includes, spreading a primer coat onto the finished surface of a fibrous base sheet by means of a doctor blade, cutting grooves through said primer coat and into said base sheet, coating the trough and shoulder portions of said grooves and the adjacent edges of said primer coat with a finishing coat containing a coloring pigment, hardening said finishing coat, applying a series of finishing coats containing coloring pigment similar to that contained in the first-named finishing coat smoothly and uniformly over said primer coat and said first-named finishing coat, hardening said last applied finishing coat, and striping said grooves.

HARRY FEDER.